(12) United States Patent
Shimmo et al.

(10) Patent No.: US 8,077,407 B2
(45) Date of Patent: Dec. 13, 2011

(54) LENS ARRAY UNIT MOUNTING STRUCTURE

(75) Inventors: Katsuhide Shimmo, Minato-ku (JP); Shiro Sato, Minato-ku (JP); Haruhiko Mamada, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 12/508,090

(22) Filed: Jul. 23, 2009

(65) Prior Publication Data
US 2010/0020421 A1   Jan. 28, 2010

(30) Foreign Application Priority Data
Jul. 28, 2008   (JP) .................. 2008-194035

(51) Int. Cl.
*G02B 7/02* (2006.01)
*G02B 27/10* (2006.01)
(52) U.S. Cl. .............. 359/811; 359/819; 359/619
(58) Field of Classification Search .......... 359/619, 359/620, 694–700, 819–824, 649
See application file for complete search history.

(56) References Cited

U.S. PATENT DOCUMENTS

| | | | | |
|---|---|---|---|---|
| 6,122,105 A * | 9/2000 | Kawai et al. | ........... | 359/618 |
| 6,612,730 B1 * | 9/2003 | Ikeda | ........... | 362/558 |
| 6,654,173 B1 * | 11/2003 | Uozu et al. | ........... | 359/619 |
| 6,693,748 B1 * | 2/2004 | Fujimoto et al. | ........... | 359/621 |
| 6,985,312 B2 * | 1/2006 | Yamakawa et al. | ........... | 359/819 |
| 7,802,899 B2 * | 9/2010 | Ikeda | ........... | 362/223 |
| 7,859,735 B2 * | 12/2010 | Cebuhar et al. | ........... | 359/237 |
| 2009/0294630 A1 * | 12/2009 | Saito et al. | ........... | 250/208.1 |

FOREIGN PATENT DOCUMENTS

JP   2001-352429 A   12/2001

\* cited by examiner

*Primary Examiner* — Mohammed Hasan
(74) *Attorney, Agent, or Firm* — Sughrue Mion, PLLC

(57) ABSTRACT

A lens array unit mounting structure mounts a lens array unit in a recess provided in a housing of an image reading device. The structure includes a right projection and a left projection provided on the lens array unit and includes a right groove and a left groove provided in the recess of the housing. The lens array unit is secured in the recess of the housing by engaging the right projection with the right groove and engaging the left projection with the left groove.

4 Claims, 2 Drawing Sheets

SUB SCANNING DIRECTION

LENS ARRAY UNIT MOUNTING STRUCTURE

BACKGROUND OF THE INVENTION

1. Field of the Invention

The present invention relates to a mounting structure for a lens array unit used in an image reading device.

2. Description of the Related Art

Some image reading devices according to the related art, such as scanners, are known to use erecting equal-magnification optical systems. The use of erecting equal-magnification optical systems allows reducing the size of devices better than reduction optical systems. In the case of image reading devices, an erecting equal-magnification optical system comprises a line light source, an erecting equal-magnification lens array, and a line image sensor.

A rod lens array capable of forming an erect equal-magnification image is conventionally used as an erecting equal-magnification lens array in an erecting equal-magnification optical system. Recently, there is proposed a lens array unit formed as a stack of a plurality of transparent lens array plates built such that the optical axes of individual convex lenses are aligned, where each transparent lens array plate includes a systematic arrangement of micro-convex lenses on both planes (see, for example, patent document No. 1). Since a lens array unit such as this comprises a stack of lens array plates formed by, for example, injection molding, an erecting equal-magnification lens arrays can be manufactured at a relatively low cost.

[patent document No. 1] JP 2001-352429

Methods for mounting a lens array unit to the housing of an image reading device include using an adhesive to secure a unit in a recess formed at a predetermined position of the housing.

However, securing of a unit by using an adhesive requires maintaining the lens array unit stationary during the process of securing, by using a dedicated jig or the like. Such an approach is disadvantageous because of poor efficiency of assembly. A slight displacement of the unit maintained by a jig or foreign materials sandwiched between the housing and the lens unit will cause a part of the lens unit to be elevated from the housing along the main scanning direction, causing the optical axis of the lens array unit to be inclined.

SUMMARY OF THE INVENTION

The present invention addresses the aforementioned problem and a purpose thereof is to provide a lens array unit mounting structure capable of improving the efficiency in mounting a lens array unit to the housing of an image reading device.

A lens array unit mounting structure according to an embodiment of the present invention for mounting a lens array unit in a recess provided in a housing of an image reading device comprises: a projection provided on one of the lens array unit and the recess of the housing; and a groove provided on the other of the lens array unit and the recess of the housing, wherein the lens array unit is secured in the recess of the housing by engaging the projection with the groove.

According to the embodiment, the lens array unit can be mounted to the housing of the image reading device by means of an engagement structure comprising the projection and the groove and without using an adhesive. Therefore, the efficiency of assembly is improved. Since the need for an adhesive is eliminated, the image reading device can be manufactured at a reduced cost.

The projection and the groove may extend in the main scanning direction of the image reading device. This ensures that no parts of the unit are elevated along the main scanning direction and the lens array unit is secured in a stable manner.

The engagement structure comprising the projection and the groove may be provided on both side planes of the lens array unit. This ensures that the lens array unit is secured in a stable manner.

The engagement structure comprising the projection and the groove may be provided below the upper plane of the lens array unit. If the projection is provided above the upper plane of the lens array unit, for example, the projection may be in contact with the glass plate of the image reading device. By providing the engagement structure comprising the projection and the groove below the upper plane of the lens array unit, such contact is prevented.

The recess of the housing may be open at one end in the main scanning direction, and the lens array unit may be mounted to the housing by being inserted into the recess from the open end. This improves the efficiency of assembling a lens array unit.

Optional combinations of the aforementioned constituting elements, and implementations of the invention in the form of methods, apparatuses, and systems may also be practiced as additional modes of the present invention.

DETAILED DESCRIPTION OF THE INVENTION

Figure 1:
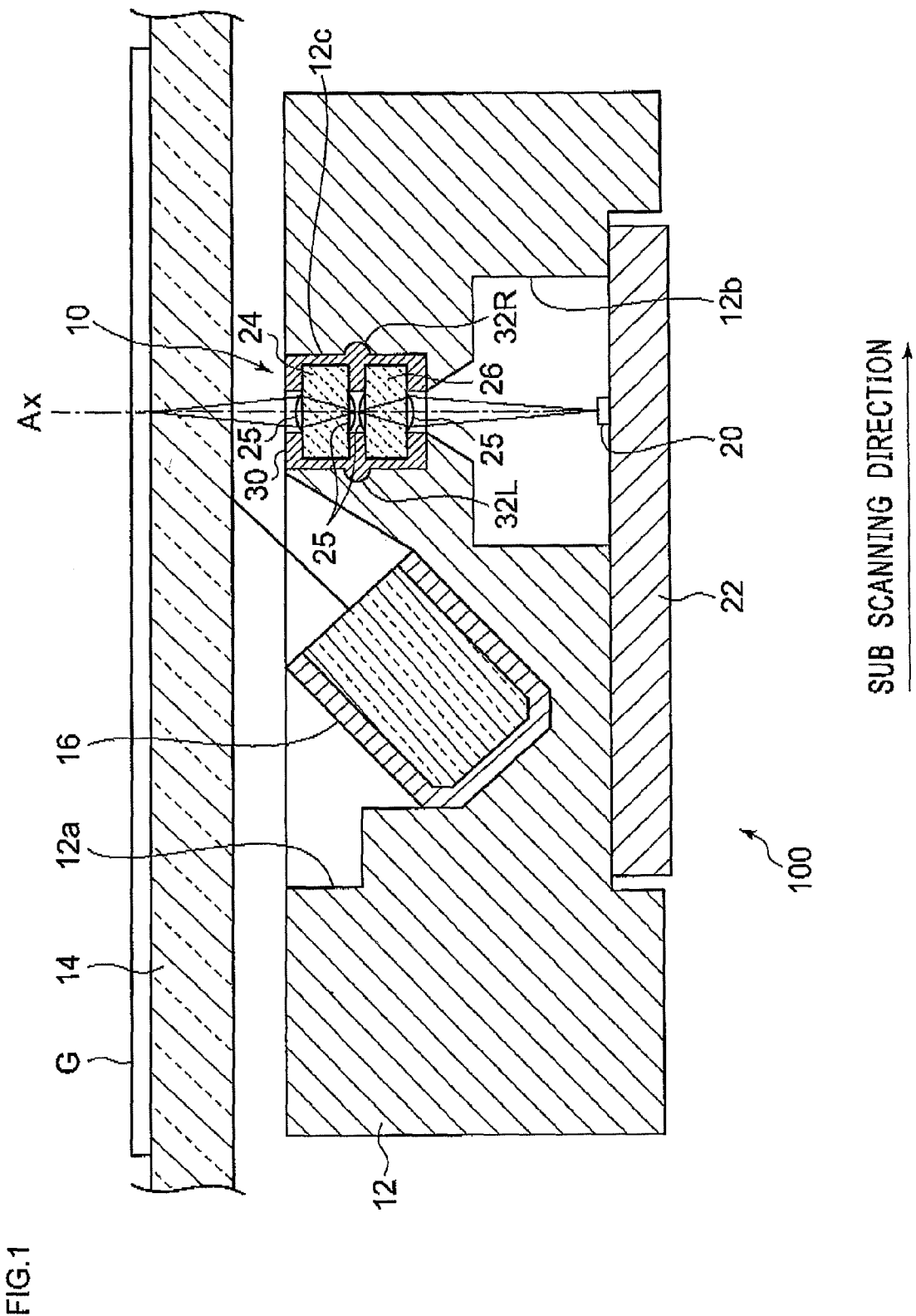
FIG. 1 is a sectional view of an image reading device in which the lens array unit mounting structure according to an embodiment of the present invention is used.

The invention will now be described by reference to the preferred embodiments. This does not intend to limit the scope of the present invention, but to exemplify the invention. FIG. 1 is a sectional view of an image reading device 100 in which the lens array unit mounting structure according to an embodiment of the present invention is used. As shown in FIG. 1, the image reading device 100 comprises a housing 12, a glass plate 14 on which a document G is placed, a line illuminator 16 for illuminating the document G with light, a lens array unit 10 for condensing light from the document G, and a line image sensor (photoelectric transducer) 20 for receiving light condensed by the lens array unit 10.

A recess 12a is formed in the upper part of the housing 12 and a recess 12b is formed in the lower part. The line illuminator 16 is diagonally fixed inside the recess 12a in the upper part. The line illuminator 16 is fixed such that the optical axis of the illuminating light passes through the intersection between the optical axis Ax of the lens array unit 10 and the upper plane of the glass plate 14. The upper plane of the recess 12a is covered by the glass plate 14. A substrate 22 provided with the line image sensor 20 is fitted in the recess 12b in the lower part. Further, a recess 12c is formed above the recess 12b of the housing 12. The lens array unit 10 is secured in the recess 12c.

The lens array unit 10 comprises a stack of a first lens array plate 24 and a second lens array plate 26 such that pairs of corresponding lenses 25 form coaxial lens systems, where each lens array plate is formed with a plurality of lenses 25 on both planes of the plate. In each of the first lens array plate 24 and the second lens array plate 26, a plurality of lenses 25 are arranged in the main scanning direction. The lens array unit 10 is configured to receive substantially straight light reflected from the document G located above and form an erect equal-magnification image on an image plane located below, i.e., a light-receiving surface of the line image sensor 20. The lens array unit 10 is mounted to the image reading device 100 such that the longitudinal direction of the lens array unit 10 is aligned with the main scanning direction and the lateral direction is aligned with the sub-scanning direction.

The first lens array plate 24 and the second lens array plate 26 are held by a holder 30 in a stacked state. The holder 30 formed as a hollow quadrangular prism. An intermediate plane is provided between an upper plane and a lower plane. Through holes aligned with the lenses 25 are formed in the upper plane, intermediate plane, and the lower plane. A right projection 32R and a left projection 32L are provided in the side planes of the holder 30. Details of the right projection 32R and left projection 32L will be described later.

For example, the holder 30 is formed by injection molding, using a light-shielding material such as black ABS resin. The first lens array plate 24 is held in a space formed by the upper plane, intermediate plane, and side planes. The second lens array plate 26 is held in a space formed by the intermediate plane, lower plane, and side planes.

In the image reading device 100, the light exiting the line illuminator device 16 irradiates the document G through the glass plate 14. The document G is read by allowing the line image sensor 20 to detect the light reflected from the document G via the lens array unit 10. A desired area on the document G is read by scanning the housing 12 in the sub-scanning direction with respect to the glass plate 14.

Figure 2:
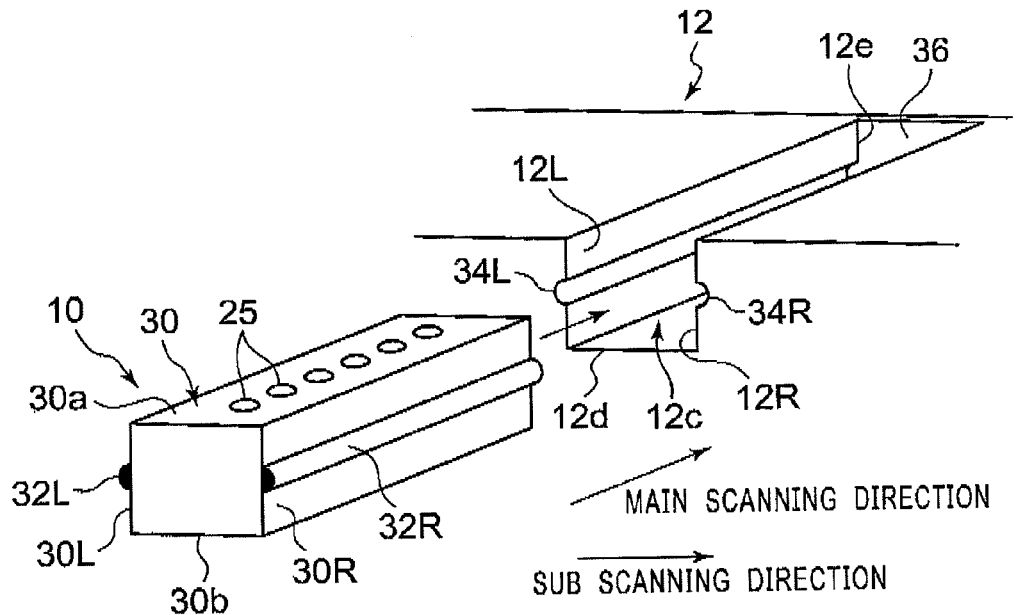
FIG. 2 is an explanatory diagram showing the lens array unit mounting structure according to the embodiment.

FIG. 2 is an explanatory diagram showing the lens array unit mounting structure according to the embodiment. FIG. 2 is a perspective view showing the lens array unit 10 detached from the housing 12.

As shown in FIG. 2, the right projection 32R and the left projection 32L are respectively provided on a right side plane 30R and a left side plane 30L of the holder 30 of the lens array unit 10. The right projection 32R and the left projection 32L are provided at a height intermediate between the upper plane 30a and the lower plane 30b on the right side plane 30R and the left side plate 30L, respectively. The right projection 32R and the left projection 32L are substantially semicircular in cross section and extend in the main scanning direction of the image reading device 100. The right projection 32R, the left projection 32L, and the holder 30 are formed as one piece.

The recess 12c formed in the housing 12 is a groove formed to a size that matches the holder 30 of the lens array unit 10, extending in the main scanning direction, and having a substantially rectangular cross section. One end 12d of the recess 12c in the main scanning direction is open and a stopper plate 36 is provided at the other end 12e.

A right groove 34R and a left groove 34L are provided in a right inner side plane 12R and a left inner side plane 12L of the recess 12c of the housing 12. The right groove 34R and the left groove 34L have a substantially semicircular cross section and is formed to be engaged with the right projection 32R and the left projection 32L, respectively. The grooves extend in the main scanning direction of the image reading device 100.

In the embodiment, the right projection 32R is engaged with the left groove 34R, and the left projection 32L is engaged with the left groove 34L, securing the lens array unit 10 in the recess 12c of the housing 12. In the engaged state, the right projection 32R is in intimate contact with or pressure-fitted to the right groove 34R, and the left projection 32L is in intimate contact with or pressure-fitted to the left groove 34L.

The lens array unit 10 is mounted in the recess 12c by inserting the unit 10 in the recess 12c such that the right projection 32R and the left projection 32L are engaged with the right groove 34R and the left groove 34L, respectively, via the open end 12d of the recess 12c. The lens array unit 10 is mounted in the recess 12c by pushing the unit 10 until one end of the unit 10 comes into contact with the stopper plate 36.

As described, according to the lens array unit mounting structure of the embodiment, the lens array unit 10 can be mounted to the housing 12 of the image reading device 100 without using an adhesive. The securing method using an adhesive requires, for example, jig-based temporary fixing for sufficient mounting precision. However, the mounting structure of the embodiment is capable of securing mounting precision without requiring temporary fixing. Therefore, the efficiency of assembly is improved. Since the need for an adhesive is eliminated, the image reading device can be manufactured at a reduced cost.

A possible trouble with adhesive-based mounting is that an excess adhesive runs over and covers the lens. The embodiment will not cause such a trouble. Accordingly, yield can be improved. Since there will not be any trouble such as exfoliation of adhesives, the long-term reliability of the image reading device can be improved.

By securing the lens array unit 10 to the housing 12 using the engagement structure comprising the projection and the groove extending in the main scanning direction, it is ensured that no parts of the unit 10 are elevated along the main scanning direction and the lens array unit 10 is secured in a stable manner.

It is favorable that the engagement structure comprising the projection and the groove be provided at both side planes of the lens array unit 10, as in the case of the embodiment. By providing the engagement structure on both side planes of the lens array unit 10, the rotation of the lens array unit 10 is restricted so that the lens array unit 10 can be secured in a stable manner.

It is favorable that the engagement structure comprising the projection and the groove be provided below the upper plane 30a of the holder 30 for holding the lens array unit 10, as in the case of the embodiment. If the projection is provided above the upper plane 30a of the lens array unit 10, the projection may be in contact with the glass plate 14 of the image reading device 100. By providing the engagement structure comprising the projection and the groove below the upper plane 30a of the lens array unit 10, such contact is prevented.

FIGS. 3A-3F are explanatory diagrams showing the lens array unit mounting structure according to another embodiment of the present invention. FIGS. 3A-3F are sectional views of the lens array units.

Figure 3A:
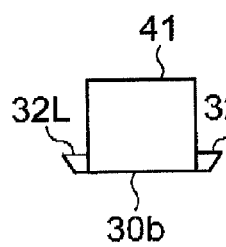
FIGS. 3A-3F are explanatory diagrams showing the lens array unit mounting structure according to another embodiment of the present invention.
Figure 3B:
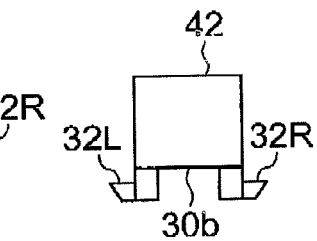
Figure 3C:
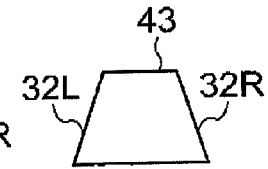
Figure 3D:
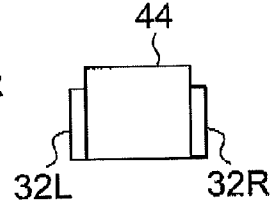

A lens array unit 41 shown in FIG. 3A is configured such that the right projection 32R and the left projection 32L each having a quadrangular cross section are formed at the height of the lower plane 30b. A lens array unit 42 shown in FIG. 3B is configured such that the right projection 32R and the left projection 32L each having a quadrangular cross section are formed below the lower plane 30b. A lens array unit 43 shown in FIG. 3C is configured such that the right projection 32R and the left projection 32L each having a triangular cross section are formed on both side planes. A lens array unit 44 shown in FIG. 3D is configured such that the right projection 32R and the left projection 32L each having a rectangular cross section are formed on both side planes. Needless to say, grooves corresponding to the right projection 32R and the left projection 32L to produce an engagement structure are formed in the recess of the housing. Thus, the position and shape of the right projection 32R and the left projection 32L are non-limiting. The projections may be provided at various positions and may have various forms.

Figure 3E:
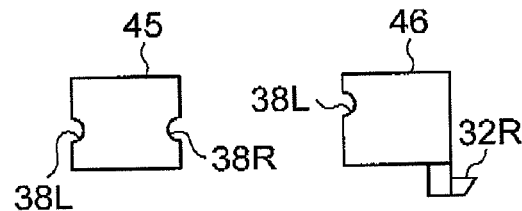

Contrary to the case of the lens array unit 10 shown in FIGS. 1 and 2, a lens array unit 45 shown in FIG. 3E is provided with grooves 38R and 38L that are adapted to be engaged with projections provided in the recess of the housing. Such a configuration also improves the efficiency of assembling the lens array unit.

Figure 3F:
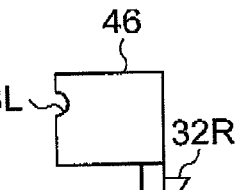

A lens array unit 46 shown in FIG. 3F is configured such that a right projection 32R is provided on the right side plane and a groove 38L is provided on the left side plane. Using a combination of projection and groove provided on the respective side planes as illustrated is also capable of improving the efficiency of assembling the lens array unit.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the described embodiment, two lens array plates are stacked to build a lens array unit capable of forming an erect equal-magnification image. Alternatively, a plurality of rod lenses may be arranged in columns to form a lens array unit. In this case, a projection or a groove may be formed in the holder for holding the rod lens.

FIG. 2 shows an embodiment where the projections extend continuously in the main scanning direction. The projections need not extend continuously as illustrated but may be provided intermittently. In an intermittent arrangement, it is favorable that three projections, i.e., two on the respective ends and one at the center, be provided in the main scanning direction in order to prevent the lens array unit from being elevated.

What is claimed is:

1. A lens array unit mounting structure for mounting a lens array unit in a recess provided in a housing of an image reading device, comprising: a projection provided on one of the lens array unit and the recess of the housing; and a groove provided on the other of the lens array unit and the recess of the housing, wherein the lens array unit is secured in the recess of the housing by engaging the projection with the groove; wherein the engagement structure of the projection and the groove is provided below the upper plane of the lens array unit.

2. The lens array unit mounting structure according to claim 1, wherein
the projection and the groove extend in the main scanning direction of the image reading device.

3. The lens array unit mounting structure according to claim 1, wherein
the engagement structure of the projection and the groove is provided on both side planes of the lens array unit.

4. The lens array unit mounting structure according to claim 1, wherein
the recess of the housing is open at one end in the main scanning direction, and the lens array unit is mounted to the housing by being inserted into the recess from the open end.

* * * * *